United States Patent [19]
Inoki et al.

[11] Patent Number: 5,760,156
[45] Date of Patent: Jun. 2, 1998

[54] MANUFACTURING METHOD FOR POLYCARBONATE

[75] Inventors: Satoshi Inoki, Otake; Yoshio Motoyama, Ono-machi; Hideto Matsuoka, Wagi-machi; Hajime Oyoshi, Iwakuni; Michio Tanaka, Otake; Tomoaki Shimoda, Moka; Akio Kanezawa, Sodegaura; Kazutoyo Uno, Chiba, all of Japan

[73] Assignee: General Electric Company, Pittsfield, Mass.

[21] Appl. No.: 764,816

[22] Filed: Dec. 12, 1996

[30] Foreign Application Priority Data

Dec. 15, 1995 [JP] Japan ................................. 7-327099

[51] Int. Cl.[6] ........................................... C08G 18/70
[52] U.S. Cl. ........................... 528/67; 528/68; 528/71; 528/196
[58] Field of Search ......................... 528/196, 67, 68, 528/71

[56] References Cited

U.S. PATENT DOCUMENTS 5,189,139  2/1993  Tuinstra et al. ................. 528/196

Primary Examiner—Terressa Mosley

[57] ABSTRACT

A manufacturing method for polycarbonate comprising [I] a process for manufacturing diaryl carbonate from an aromatic hydroxy compound and an aromatic hydroxy compound, [II] a process for manufacturing polycarbonate by solution polymerization of the diaryl carbonate obtained in [II] and an aromatic dihydroxy compound in the presence of a catalyst comprising a nitrogen-containing basic compound, and [III] a process for separating and removing the nitrogen-containing compound from the aromatic hydroxy by-products in [II] and returning the resultant aromatic hydroxy compounds to process [I] effectively reuses aromatic hydroxy by-products (e.g., phenols) of polycarbonate manufacturing to manufacture diaryl carbonate, while suppressing the production of alkyl aromatic ethers and then uses this diaryl carbonate to manufacture polycarbonate with good productivity.

10 Claims, 1 Drawing Sheet

MANUFACTURING METHOD FOR POLYCARBONATE

The present invention concerns manufacturing methods for polycarbonate; more specifically, it concerns a highly efficient method of manufacturing polycarbonate whereby aromatic hydroxy by-product produced in the polycarbonate manufacturing step is reused to manufacture diaryl carbonate, which is then used as a raw material in the manufacture of polycarbonate.

It is well known that polycarbonates can be manufactured by solution polycondensation of a diaryl carbonate such as diphenyl carbonate and an aromatic hydroxy compound. Catalysts, for example, nitrogen-containing basic compounds such as amines and alkali metal compounds (or alkaline-earth metal compounds), are used in the reaction of the diaryl carbonate and aromatic dihydroxy compound. Advantages of this solution polycondensation approach are that polycarbonate can be manufactured more inexpensively than with the interfacial (solution) process in which aromatic dihydroxy compounds and phosgene are reacted directly and that it is preferable environmentally because toxic substances such as phosgene are not used.

Polycarbonate obtained in this manner has excellent mechanical properties such as impact resistance, excellent heat resistance, transparency, and the like, and is widely used in various mechanical parts, optical disks, automobile parts, and the like.

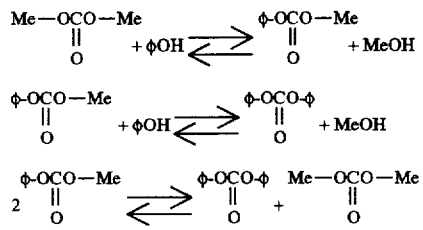

It is also known that diaryl carbonate, which is used as a raw material for manufacturing polycarbonate, is obtained by reacting dialkyl carbonate and aromatic hydroxy compounds. For example, diphenyl carbonate can be obtained by reacting dimethyl carbonate and phenol as follows.

It is further known that alkyl aromatic ethers are produced as by-products along with diaryl carbonate, the desired product of the above-described reaction. For example, it is known that reactions of dimethyl carbonate and phenol produce anisole as a by-product, albeit at low selectivities.

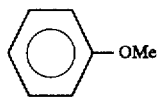

Anisole is apparently produced by the decarboxylation of methyl phenyl carbonate, a reaction product.

Manufacturing methods for polycarbonate such as those hereinabove also produce aromatic hydroxy by-products such as phenols in addition to the polycarbonate reaction product.

Recycling aromatic hydroxy by-product of the polycarbonate manufacturing process to the diaryl carbonate manufacturing process for reuse would therefore be a logical means of manufacturing polycarbonate economically.

While studying such manufacturing methods for polycarbonate, the present inventors discovered that if aromatic hydroxy compounds recovered from the polycarbonate manufacturing process are recycled and reused as obtained in a continuous operation, the efficiency of the diaryl carbonate reaction will decline. When they studied the reason for this, the inventors discovered that the production of alkyl aromatic ether by-products such as anisole (apparently by the thermal decomposition of alkyl aryl carbonate) in the reaction of dialkyl carbonate and aromatic hydroxy compounds is increased by the presence of residual nitrogen-containing basic compounds such as amines in the aromatic hydroxy compounds (especially phenol) recycled from the polycarbonate manufacturing process.

Based on such information, the inventors discovered that polycarbonate can be manufactured efficiently by separating and removing nitrogen-containing basic compounds from aromatic hydroxy compounds recovered from polycarbonate manufacturing processes using nitrogen-containing basic compounds as catalyst and then recycling the recovered aromatic hydroxy compounds to the diaryl carbonate manufacturing process for reuse, leading to the invention.

The object of the present invention is to provide an efficient manufacturing method for polycarbonate whereby the aromatic hydroxy by-products of polycarbonate manufacturing, e.g., phenols, are effectively reused and alkyl aromatic ether production is suppressed in the manufacture of diaryl carbonate and then the resultant diaryl carbonate is used to manufacture polycarbonate.

The manufacturing method for polycarbonate of the invention is characterized by the fact that it comprises

[I] a process for manufacturing diaryl carbonate by reacting dialkyl carbonate and an aromatic hydroxy compound in the presence of a catalyst and for removing alcoholic by-product and dialkyl carbonate by-product from the reaction system,

[II] a process for manufacturing polycarbonate by reacting the diaryl carbonate obtained in process [I] and an aromatic dihydroxy compound in the presence of a catalyst containing at least one nitrogen-containing basic compound and for removing aromatic hydroxy compound by-product from the reaction system, and

[III] a process for separating and removing the nitrogen-containing basic compound from the aromatic hydroxy compound by-product produced in process [II] and recycling the resultant aromatic hydroxy compound to process [I].

In process [III] hereinabove, the preferred amount of nitrogen-containing compound in the aromatic hydroxy compound recycled to process [I] does not exceed $10^{-4}$ mole per mole.

The preferred dialkyl carbonate is dimethyl carbonate or diethyl carbonate.

The preferred aromatic hydroxy compound is phenol, m-cresol, and/or p-cresol.

The manufacturing method for polycarbonate of the invention is characterized by the fact that it comprises

[I] a process for manufacturing diaryl carbonate by reacting dialkyl carbonate and an aromatic hydroxy compound in the presence of a catalyst and for removing alcoholic by-product and dialkyl carbonate by-product from the reaction system,

[II] a process for manufacturing polycarbonate by reacting the diaryl carbonate obtained in process [I] and an aromatic dihydroxy compound in the presence of a catalyst containing at least one nitrogen-containing basic compound and for removing aromatic hydroxy compound by-product from the reaction system, and

[III] a process for separating and removing the nitrogen-containing basic compound from the aromatic hydroxy compound by-product produced in process [II] and recycling the resultant aromatic hydroxy compound to process [I].

FIG. 1 is a flow chart for the processes used in the manufacturing method for polycarbonate of the invention. These processes are described hereinbelow.

[I] Manufacturing Method for Diaryl Carbonate

In process [I] of the present invention, as diaryl carbonate is manufactured by reacting dialkyl carbonate and an aromatic hydroxy compound in the presence of a catalyst, alcoholic and dialkyl carbonate by-products are removed from the reaction system.

When dialkyl carbonate and an aromatic hydroxy compound are reacted, alkyl aryl carbonate, diaryl carbonate, or mixtures of them are produced in the manner shown hereinbelow.

It is preferred to first manufacture alkyl aryl carbonate and then manufacture diaryl carbonate from the alkyl aryl carbonate.

$$R-\underset{\underset{O}{\|}}{O}CO-R + \phi OH \rightleftharpoons \phi-\underset{\underset{O}{\|}}{O}CO-R + ROH \quad M \quad (1)$$

Dialkyl carbonate + Aromatic hydroxy compound → Alkylaryl carbonate $$\phi-\underset{\underset{O}{\|}}{O}CO-R + \phi OH \rightleftharpoons \phi-\underset{\underset{O}{\|}}{O}CO-\phi + ROH \quad M \quad (2)$$

Diaryl carbonate $$2\,\phi-\underset{\underset{O}{\|}}{O}CO-R \rightleftharpoons \phi-\underset{\underset{O}{\|}}{O}CO-\phi + R-\underset{\underset{O}{\|}}{O}CO-R \quad M \quad (3)$$

Alkylaryl carbonate → Diaryl carbonate ($\phi$: Ar)

The dialkyl carbonate used in diaryl carbonate manufacturing process [I] is described by formula (i) hereinbelow.

$$R^a O\underset{\underset{O}{\|}}{C}OR^b \quad (i)$$

where $R^a$ and $R^b$ are alkyl groups, alkenyl groups, alicyclic groups, or aralkyl groups. $R^a$ and $R^b$ may be the same or different, and they may form a ring.

Specific examples of $R^a$ and $R^b$ include alkyl groups such as methyl groups, ethyl groups, propyl groups, butyl groups, pentyl groups, hexyl groups, heptyl groups, octyl groups, nonyl groups, and decyl groups;

alkenyl groups, allyl groups, and butenyl groups;

alicyclic groups such as cyclopropyl groups, cyclobutyl groups, cyclopentyl groups, cyclohexyl groups, and cycloheptyl groups;

alkyl groups containing alicyclic groups such as cyclohexylmethyl groups; and aralkyl groups such as benzyl groups, phenethyl groups, phenylpropyl groups, phenylbutyl groups, and methylbenzyl groups.

These groups may be substituted with lower alkyl groups, lower alkoxy groups, cyano groups, and halogen, and they may contain unsaturated bonds.

Examples of dialkyl carbonate described by formula (i) include dimethyl carbonate, diethyl carbonate, dipropyl carbonate, diallyl carbonate, dibutenyl carbonate, dibutyl carbonate, dipentyl carbonate, dihexyl carbonate, diheptyl carbonate, dioctyl carbonate, dinonyl carbonate, didecyl carbonate, methyl ethyl carbonate, methyl propyl carbonate, methyl butyl carbonate, ethyl propyl carbonate, ethyl butyl carbonate, ethylene carbonate, propylene carbonate, di(methoxymethyl) carbonate, di(methoxyethyl) carbonate, di(chloroethyl) carbonate, di(cyanoethyl) carbonate, dicyclopentyl carbonate, dicyclohexyl carbonate, dicycloheptyl carbonate, dibenzyl carbonate, diphenethyl carbonate, di(phenylpropyl) carbonate, di(phenylbutyl) carbonate, di(chlorobenzyl) carbonate, and di(methoxybenzyl) carbonate.

These dialkyl carbonates may be used in combinations of two or more.

Preferred among these is dialkyl carbonate where each $R^a$ and $R^b$ is an alkyl group with no more than four carbon atoms, with dimethyl carbonate and diethyl carbonate more preferred and dimethyl carbonate especially preferred.

The aromatic hydroxy compound used in diaryl carbonate manufacturing process [I] is described by formula (ii) hereinbelow.

$$Ar^1 OH \quad (ii)$$

$Ar^1$ is a monovalent aromatic group which may have a substituent.

Examples of such aromatic monohydroxy compounds include alkylphenols such as phenol, cresol, xylenol, trimethylphenol, tetramethylphenol, ethylphenol, propylphenol, butylphenol, diethylphenol, methylethylphenol, methylpropylphenol, dipropylphenol, methylbutylphenol, pentylphenol, hexylphenol, and cyclohexylphenol; alkoxyphenols such as methoxyphenol and ethoxyphenol;

naphthols and substituted naphthols;

and substituted phenols described by the formula

⬡—A—⬡—OH where A is —O—, —S—, —CO—, $SO_2$—; a substituted alkylene such as $$-\underset{\underset{R^5}{|}}{\overset{\overset{R^4}{|}}{C}}-,\ -\underset{\underset{R^5}{|}}{\overset{\overset{R^4}{|}}{C}}-\underset{\underset{R^7}{|}}{\overset{\overset{R^6}{|}}{C}}-;$$

a divalent group such as cycloalkylene, for example

\C⟨(CH$_2$)$_k$⟩
/ or simply a bond.

In these formulas, each $R^4$, $R^5$, $R^6$, and $R^7$ is a hydrogen atom, lower alkyl group, cycloalkyl group, aryl group, or aralkyl group, which may be substituted with a halogen atom or alkoxy group. k is an integer ranging in value from 3 to 11, and the hydrogen atoms may be substituted with lower alkyl groups, aryl groups, halogen atoms, or the like.

Furthermore, alicyclic groups may be substituted with substituents such as lower alkyl groups, lower alkoxy groups, ester groups, hydroxyl groups, nitro groups, halogen, and cyano groups.

Heteroaromatic hydroxy compounds such as hydroxypyridine, hydroxycoumarin, and hydroxyquinoline can also be cited as examples of the aromatic hydroxy compound.

Aromatic dihydroxy compounds can also be used, examples including hydroquinone, resorcinol, catechol, dihydroxynaphthalene, dihydroxyanthracene, and alkylated forms of them. Aromatic dihydroxy compounds described by the following formula can also be used.

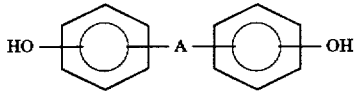

where A is identical to A hereinabove, and the alicyclic may be substituted with a substituent such as a lower alkyl group, lower alkoxy group, ester group, hydroxyl group, nitro group, halogen, or cyano group.

In the present invention, aromatic monohydroxy compounds in which $Ar^1$ in the above-mentioned formula (ii) is an aromatic group with six to 10 carbon atoms are preferred, with phenol, m-cresol, and/or p-cresol being more preferred, and phenol being especially preferred. Aromatic hydroxy compounds may be used in combinations of two or more.

Specific examples of the diaryl carbonate obtained by reacting dialkyl carbonate and an aromatic hydroxy compound in process [I] for manufacturing diaryl carbonate include diphenyl carbonate,
ditolyl carbonate,
phenyl tolyl carbonate,
bis(chlorophenyl) carbonate,
m-cresyl carbonate,
di(ethylphenyl) carbonate,
phenyl (ethylphenyl) carbonate,
dinaphthyl carbonate,
di(hydroxyphenyl) carbonate, and
di[2-(hydroxyphenylpropyl)phenyl]carbonate.

Among these, it is preferred to manufacture diphenyl carbonate, ditolyl carbonate, and phenyl tolyl carbonate. Manufacturing diphenyl carbonate is especially preferred.

Alkyl aromatic ethers that can be described by $Ar^1OR^a$ or $Ar^1OR^b$ are by-products of the reaction of a dialkyl carbonate and an aromatic hydroxy compound.

For example, anisole is an alkyl aromatic ether by-product of the reaction of dimethyl carbonate and phenol.

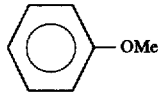

The above-described reaction of a dialkyl carbonate and an aromatic hydroxy compound is conducted in the presence of a catalyst in the conventional liquid state.

Any commonly used conventional catalyst for manufacturing diaryl carbonates can be used in the invention without any particular restrictions.

The catalyst used in the invention may be soluble (homogeneous) or insoluble (heterogeneous) in the reaction fluid under the reaction conditions.

Examples of the catalyst include Lewis acids, organotin compounds, lead compounds, compounds of the copper family metals, alkali metal complexes, zinc complexes, compounds of the iron family metals, zirconium complexes, and solid catalysts. More specific examples include the following.

Examples of Lewis acids include Lewis acids and transition metal compounds producing Lewis acids such as $AlX_3$, $TiX_3$, $TiX_4$, $VOX_3$, $VX_5$, $ZnX_2$, $FeX_3$, and $SnX_4$ (where X is a halogen, acetoxy group, alkoxy group, or aryloxy group). More specific examples include titanium tetrachloride, titanium tetraphenoxide, titanium tetramethoxide, titanium tetraethoxide, titanium tetracresolate, titanium tetraisopropylate, titanium tetradodecylate, tin tetraisooctylate, and aluminum triisopropylate.

Examples of organotin compounds include trimethyltin acetate, triethyltin acetate, tributyltin acetate, triphenyltin acetate, dibutyltin diacetate, dibutyltin dilaurate, dioctyltin dilaurate, dibutyltin adipate, dibutyldimethoxytin, dimethyltin glycolate, dibutyldiethoxytin, triethyltin hydride, hexaethylstannoxane, hexabutylstannoxane, dibutyltin oxide, dioctyltin oxide, butyltin triisooctylate, octyltin triisooctylate, butylstannic acid, octylstannic acid, polymeric tin compounds such as poly[oxy(dibutylstannylene)], and polymeric hydroxystannoxanes such as poly (ethylhydroxystannoxane).

Examples of lead compounds include lead oxides such as PbO, $PbO_2$, and $Pb_3O_4$; lead sulfides such as PbS and $Pb_2S$; lead hydroxides such as $Pb(OH)_2$ and $Pb_2O_2(OH)_2$; plumbites such as $Na_2PbO_2$, $K_2PbO_2$, $NaHPO_2$, and $KHPbO_2$; plumbates such as $Na_2PbO_3$, $Na_2H_2PbO_4$, $K_2PbO_3$, $K_2[Pb(OH)_6]$, $K_4PbO_4$, $Ca_2PbO_4$, and $CaPbO_3$; lead carbonates such as $PbCO_3$, $2PbCO_3 \times Pb(OH)_2$, and their basic salts; lead salts and lead carbonates of organic acids and their basic salts such as $Pb(OCOCH_3)_2$, $Pb(OCOCH_3)_4$, $Pb(OCOCH_3)_2 \times PbO \times 3H_2O$, and their basic salts; organolead compounds such as $R_4Pb$, $R_3PbCl$, $R_3PbBr$, and $R_3Pb$ or $R_6Pb_2$, $R_3PbOH$, and $R_3PbO$ (where R is an alkyl group such as $C_4H_9$ or an aryl group such as phenyl); alkoxyleads such as $Pb(OCH_3)_2$, $(CH_3O)Pb(OPh)$, and $Pb(OPh)_2$; aryloxyleads; lead alloys such as Pb-Na, Pb-Ca, Pb-Ba, Pb-Sn, and Pb-Sb; lead minerals such as galena and sphalerite [sic]; and hydrates of these lead compounds.

Examples of copper family metal compounds include salts and complexes (where acac is a ligand chelated with acetylacetone) of copper family metals such as CuCl, $CuCl_2$, CuBr, $CuBr_2$, CuI, $CuI_2$, $Cu(OAc)_2$, $Cu(acac)_2$, copper olefinate, $Bu_2Cu$, $(CH_3O)_2Cu$, $AgNO_3$, AgBr, silver picrate, $AgC_6H_6ClO_4Ag(bruvarene)_3NO_3$, and $[AuC^0C—C(CH_3)_3]_n[Cu(C_7H_8)Cl]_4$.

Examples of alkali metal complexes include Li(acac) and $LiN(C_4H_9)_2$.

Examples of zinc complexes include $Zn(acac)_2$.

Examples of cadmium complexes include $Cd(acac)_2$.

Examples of iron family metal compounds include $Fe(C_{10}H_8)(CO)_5$, $Fe(CO)_5$, $CoC_5F_6)(CO)_7Ni$—$C_5H_5NO$, and ferrocene.

Examples of zirconium complexes include $Zr(acac)_4$ and zirconocene.

Examples of solid catalysts include silica, alumina, titania, silica-titania, zinc oxide, zirconium oxide, gallium oxide, zeolite, and rare earth oxides.

Of these, homogeneous catalysts are preferred. It is especially preferred to use Lewis acids such as titanium tetraphenoxide, titanium tetramethoxide, and titanium tetraisopropylate; organotin compounds such as $Bu_2SnO$ and $[Bu_2Sn(OPh)]_2O$; and alkoxylead compounds such as $Pb(OPh)_2$.

These catalysts may be mixed with compounds or carriers that are inert in the reaction, and they may be supported on carriers. The catalysts may also be substances that react with the reaction materials and reaction products present in the reaction system, and they may be heat-treated in advance, together with the reaction materials and reaction products.

When a homogeneous catalyst is used as the catalyst in the present invention, it may be introduced into the reaction system by a continuous feed to the reactor. Heterogeneous catalysts may be placed in the reactor for introduction into the reaction system.

When a homogeneous catalyst is continuously fed to the reactor, it may be fed as a mixture with the dialkyl carbonate and/or aromatic hydroxy compound reaction material(s), or it may be fed separately.

In the present invention, this reaction can be conducted with a solvent copresent, as desired. A solvent that is inert in the reaction can be used, examples including ethers, aliphatic hydrocarbons, and halogenated aromatic hydrocarbons.

The reaction can also be conducted with inert gases such as nitrogen, helium, and argon present.

Examples of apparatuses that can be used for the reaction include continuous reactors equipped with distilling columns, typified by reactors having reaction-type distilling columns or distilling columns, but reaction-type distilling columns are preferred.

It is preferred to use a reaction-type distilling column with a large vapor-liquid boundary to enhance the productivity of the above-mentioned reaction. Specifically, a multistage distilling column having at least two distilling stages can be used, examples including conventional multistage distilling columns such as plate columns, packed columns, and columns combining plates and packing. It is preferred to have the catalyst present on all stages of such multistage distilling columns. When a solid catalyst is used in a packed column, it can comprise part or all of the packing.

In the present invention, it is preferred to use two reaction columns to carry out process [I] for manufacturing diaryl carbonate so that reaction (1), which produces chiefly alkyl aryl carbonate, is carried out in the first reaction column and reactions (2) and (3), which produce diaryl carbonate, are carried out in the second column.

While the reaction conditions differ according to the type and construction of the reactor and the reaction materials, the reaction is usually conducted at a temperature (internal column temperature) of 50° to 350° C., 100° to 280° C. being preferred and 150° to 280° C. being especially preferred. The reaction may be conducted at reduced, ordinary, or elevated pressure, but it is usually conducted at pressures ranging from 2,600 to 5.4 MPa. The mean residence time in the reactor is usually 0.001 to 50 h, with a time ranging from 0.01 to 10 h being preferred and 0.05 to 5 h being more preferred.

It is desirable to feed the dialkyl carbonate and aromatic hydroxy compound in amounts such that their molar ratio (dialkyl carbonate/aromatic hydroxy compound) in the reaction system ranges from 0.2 to 10, preferably 0.5 to 5.

The dialkyl carbonate and aromatic hydroxy compound may be fed to the reactor separately or through the same feed pipe.

When the catalyst is fed continuously to the reactor, it is usually used in amounts ranging from 0.001 to 10 molar percent, preferably 0.01 to 5.0 molar percent, based on the aromatic hydroxy compound reaction material, although this differs according to factors such as the type of catalyst and reaction conditions.

The diaryl carbonate produced in the reaction of dialkyl carbonate and aromatic hydroxy compound is usually removed from the bottom of the reactor. The reaction mixture, which usually contains unreacted materials (dialkyl carbonate and aromatic hydroxy compounds), alkyl aromatic ether by-products, and catalyst as well as diaryl carbonate is removed from the bottom of the reactor together with this diaryl carbonate.

It is preferred to separate the diaryl carbonate from this reaction mixture, refine it, and then feed it to process [II] for manufacturing polycarbonate. This separation and refinement can be carried out by conventional distillation.

The unreacted raw materials removed from the bottom of the reactor together with the diaryl carbonate can be separated by distillation and then recycled to manufacturing process [I] for reuse.

In process [I] for manufacturing diaryl carbonate, alcoholic by-products are usually distilled off from the top of the reactor as the reaction progresses. However, unreacted dialkyl carbonate and the like can also be removed from the top of the reaction apparatus together with the alcoholic by-products. Alcoholic by-products and alkyl aromatic ethers can be separated and removed from unreacted dialkyl carbonate taken from the top of the reactor, and then the unreacted dialkyl carbonate can be recycled to manufacturing process [I].

Process [II] for Manufacturing Polycarbonate

In process [II] for manufacturing polycarbonate of the present invention, polycarbonate is manufactured by melt polycondensation of an aromatic dihydroxy compound and diaryl carbonate, obtained in the above-described manner, in the presence of a catalyst containing at least one nitrogen-containing compound, and aromatic hydroxy compound by-products are removed from the reaction system.

There are no particular restrictions on the aromatic dihydroxy compound. When a compound such as that described by formula (iii) hereinbelow is used, the reaction between the diaryl carbonate and aromatic dihydroxy compound can be described as follows.

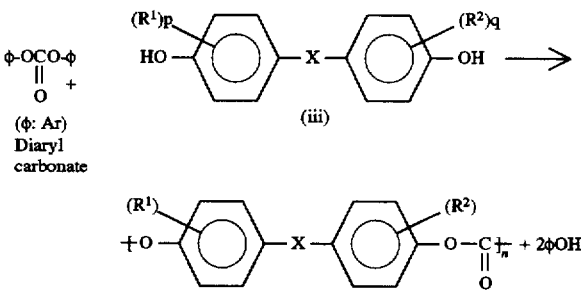

$R^1$ and $R^2$ in formula (iii) describing the aromatic dihydroxy compound are halogen atoms or monovalent hydrocarbon groups which may be substituted with halogen, and $R^1$ and $R^2$ may be the same or different. p and q are integers ranging from 0 to 4, indicating the respective numbers of substituents. When p or q are at least 2, all of the $R^1$s and $R^2$s may be the same or different.

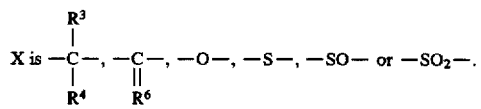

In this formula, $R^3$ and $R^4$ are hydrogen atoms or monovalent hydrocarbon groups, and $R^5$ is a bivalent hydrocarbon group.

Specific examples of the aromatic dihydroxy compound include the following:
bis(hydroxyaryl)alkanes such as
bis(4-hydroxyphenyl)methane,
1,1-bis(4-hydroxyphenyl)ethane,
2,2-bis(4-hydroxyphenyl)propane,
2,2-bis(4-hydroxyphenyl)butane,
2,2-bis(4-hydroxyphenyl)octane,
bis(4-hydroxyphenyl)phenylmethane,
2,2-bis(4-hydroxy-1-methylphenyl)propane,
1,1-bis(4-hydroxy-t-butylphenyl)propane, and
2,2-bis(4-hydroxy-3-bromophenyl)propane;
bis(hydroxyaryl)cycloalkanes such as
1,1-bis(4-hydroxyphenyl)cyclopentane and
1,1-bis(4-hydroxyphenyl)cyclohexane;
dihydroxyaryl ethers such as
4,4'-dihydroxydiphenyl ether and
4,4'-dihydroxy-3,3'-dimethyldiphenyl ether;
dihydroxydiaryl sulfides such as
4,4'-dihydroxydiphenyl sulfide and
4,4'-dihydroxy-3,3'-dimethyldiphenyl sulfide;
dihydroxydiaryl sulfoxides such as
4,4'-dihydroxydiphenyl sulfoxide and
4,4'-dihydroxy-3,3'-dimethyldiphenyl sulfoxide; and
dihydroxydiaryl sulfones such as
4,4'-dihydroxydiphenyl sulfone and
4,4'-dihydroxy-3,3'-dimethyldiphenyl sulfone.

Of these, it is especially preferred to use 2,2-bis(4-hydroxyphenyl)propane (referred to as bisphenol A hereinbelow).

Substances that can be used as the aromatic dihydroxy compounds are resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, and 2,3,4,6-tetrabromoresorcinol; catechol; hydroquinone and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, and 2,3,5,6-tetrabromohydroquinone; and 2,2,2',2'-tetrahydro-3,3,3',3'-tetramethyl-1,1'-spirobi-[1H-indene]-6,6'-diol.

Aromatic dihydroxy compounds and diaryl carbonates may be used in combinations of two or more each.

Diaryl carbonate is usually used in amounts of 1.0 to 1.30 moles, preferably 1.01 to 1.20 moles, per mole of aromatic dihydroxy compound in the polycondensation reaction of diaryl carbonate and aromatic dihydroxy compounds.

Dicarboxylic acids or dicarboxylic acid esters can be polycondensed together with aromatic dihydroxy compounds and diaryl carbonate in the manufacturing process for polycarbonate.

Examples of such dicarboxylic acids or dicarboxylic acid esters include
aromatic dicarboxylic acids such as terephthalic acid, isophthalic acid, diphenyl terephthalate, and diphenyl isophthalate;
aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, and diphenyl dodecanedioate;
alicyclic dicarboxylic acids such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, and 1,4-cyclohexanedicarboxylic acid and
esters such as diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, and diphenyl 1,4-cyclohexanedicarboxylate.

These dicarboxylic acids or dicarboxylic acid esters, which may be used in combinations of two or more, can be used in amounts such that they account for no more than 50 molar percent, preferably no more than 30 molar percent, based on the diaryl carbonate used (i.e., amount of diaryl carbonate used=100 molar percent).

A polyfunctional compound containing three or more functional groups per molecule can also be used with the above-described aromatic dihydroxy compounds and diaryl carbonate to manufacture polycarbonate in accordance with the present invention.

Preferred examples of such polyfunctional compounds include compounds with phenolic hydroxyl or carboxyl groups, compounds with three phenolic hydroxyl groups being especially preferred. Specific examples include 1,1,1-tris(4-hydroxyphenyl)ethane, 2,2',2"-tris(4-hydroxyphenyl) diisopropylbenzene, a-methyl-a,a',a'-tris(4-hydroxyphenyl)-1,4-diethylbenzene, a,a',a"-tris(4hydroxyphenyl)-1,3,5-triisopropylbenzene, phloroglucinol, 4,6-dimethyl-2,4,6-tris (4-hydroxyphenyl)-heptane-2, 1,3,5-tris(4-hydroxyphenyl) benzene, 2,2-bis[4,4-(4,4'-dihydroxyphenyl)cyclohexyl] propane, trimellitic acid, 1,3,5-benzenetricarboxylic acid, and pyromellitic acid.

Polyfunctional compounds can be used in amounts of usually less than 0.03 moles, preferably 0.001 to 0.02 moles, more preferably 0.001 to 0.01 moles, per mole of aromatic dihydroxy compound.

In the present invention, polycarbonate is manufactured by solution polycondensation of the above-described aromatic dihydroxy compound and diaryl carbonate in the presence of a catalyst, which should be at least one nitrogen-containing basic compound.

It is preferred to use a nitrogen-containing compound that is volatile or decomposes readily at high temperatures.

Specific examples include amines, for example,
tertiary amines such as trimethylamine, triethylamine, dimethylbenzylamine, triphenylamine, trioctylamine, trinonylamine, tridecylamine, triundecylamine, tridodecylamine, tritridecylamine, tritetradecylamine, tripentadecylamine, trihexadecylamine, triheptadecylamine, trioctadecylamine, trinonadecylamine, trieicosylamine, tritetracyclododecylamine, trihexacycloheptadecylamine, dimethylbenzylamine, and triphenylamine;
secondary amines described by $R_2NH$ (where R is an alkyl such as methyl or ethyl or an aryl such as phenyl or tolyl) such as didodecylamine, ditridecylamine, ditetradecylamine, dipentadecylamine, dihexadecylamine, diheptadecylamine, dioctadecylamine, dinonadecylamine, dieicosylamine, diheneicosylamine, didoeicosylamine, ditetracyclododecylamine, dihexacycloheptadecylamine, diphenylamine, and ditolylamine;

primary amines described by $RNH_2$ (where R is the same as described hereinabove) such as tetracosylamine, heptacosylamine, hexacosylamine, heptacosylamine, octacosylamine, nonacosylamine, triacontylamine, tetracontylamine, pentacontylamine, and hexacontylamine.

Further examples include ammonium hydroxides with alkyl groups, aryl groups, aralkyl groups, or the like such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide ($f\text{-}CH_2(Me)_3NOH$);

pyridines such as 4-dimethylaminopyridine, 4-diethylaminopyridine, and 4-pyrrolidinopyridine;

imidazoles such as 2-methylimidazole, 2-phenylimidazole, and 2-dimethylaminoimidazole;

and basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$), and tetramethylammonium tetraphenylborate ($Me_4NBPh_4$).

Preferred among these are tertiary amines, especially tertiary amines with 24 to 50 carbon atoms, and tetraalkylammonium hydroxides, especially, for example, tetraalkylammonium hydroxide for use in electronics which contains few metallic impurities.

These nitrogen-containing compounds can usually be used in amounts of $1\cdot10^{-6}$ to $1\cdot10^{-1}$ mole, preferably $1\cdot10^{-5}$ to $1\cdot10^{-2}$ mole, per mole of aromatic dihydroxy compound.

In addition to nitrogen-containing compounds, alkali metal compounds or alkaline-earth metal compounds and/or boric acid compounds may be used as catalyst in the present invention.

Organic acid salts, inorganic acid salts, oxides, hydroxides, hydrides, alcoholates, or the like of alkali metals or alkaline-earth metals are especially preferred examples of alkali metal and alkaline-earth metal compounds.

Specific examples of alkali metal compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium phenylborate, sodium benzoate, potassium benzoate, lithium benzoate, disodium hydrogen phosphate, dipotassium hydrogen phosphate, dilithium hydrogen phosphate, the disodium, dipotassium, or dilithium salts of bisphenol A, and the sodium, potassium, or lithium salts of phenols.

Specific examples of alkaline-earth metal compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate.

These may be used in combinations of two or more.

Such alkali metal compounds (or alkaline-earth metal compounds) can usually be used in amounts of $1\times10^{-8}$ to $1\times10^{-3}$ mole, preferably $1\times10^{-7}$ to $2\times10^{-6}$ mole, per mole of the above-described aromatic dihydroxy compound.

It is preferred to use an alkali metal compound (or alkaline-earth metal compound) as catalyst together with the nitrogen-containing basic compound because the polycondensation reaction of the aromatic dihydroxy compound and diaryl carbonate will progress at sufficient speed and yield high-molecular-weight polycarbonates at a high level of polymerization activity. When an alkali metal compound or alkaline-earth metal compound is used in the above-described amounts, polycarbonate can be manufactured at a high level of polymerization activity and the basicity shown by these compounds can be sufficiently neutralized or weakened by adding acidic compounds in amounts that will not adversely effect the resulting polycarbonate.

Boric acid compounds can also be used with nitrogen-containing basic compounds as the catalyst in the present invention. Examples of boric acid compounds include boric acid and boric acid esters.

Boric acid esters that can be used are described by, for example, the following general formula

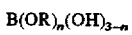

$$B(OR)_n(OH)_{3-n}$$

where R is an alkyl such as methyl or ethyl or an aryl such as phenyl, and n is the integer 1, 2, or 3.

Examples of boric acid esters include trimethyl borate, triethyl borate, tributyl borate, trihexyl borate, triheptyl borate, triphenyl borate, tritolyl borate, and trinaphthyl borate.

These borate compounds can usually be used in amounts of $1\times10^{-8}$ to $1\times10^{-1}$ mole, preferably $1\times10^{-7}$ to $1\times10^{-2}$ mole, more preferably $1\times10^{-6}$ to $1\times10^{-4}$ mole, per mole of aromatic dihydroxy compound.

A catalyst containing boric acid compounds is preferred because it enables polycarbonate that is resistant to reductions in molecular weight upon heat aging to be manufactured.

The polycondensation reaction between aromatic dihydroxy compound and diaryl carbonate conducted in the presence of such catalysts can be conducted under conditions conventionally used for such reactions.

Specifically, in the first step of the reaction, the aromatic dihydroxy compound and diaryl carbonate are reacted at ordinary pressure and a temperature of 80° to 250° C., preferably 100° to 230° C., more preferably 120° to 190° C., for 0 to 5 h, preferably 0 to 4 h, more preferably 0 to 3 h. Next, the pressure of the system is lowered as the temperature is raised, and the reaction is continued. Finally, the polycondensation reaction of the aromatic dihydroxy compound and diaryl carbonate is completed at a reduced pressure of no more than 5 mm Hg, preferably no more than 1 mm Hg, and temperature of 240° to 320° C.

This polycondensation reaction may be conducted as a continuous or batchwise process, using a tank-, tubular-, or column-type reactor.

Polycarbonate with an intrinsic viscosity of usually 0.10 to 1.0 dL/g, preferably 0.30 to 0.65 dL/g, measured in methylene chloride at 20° C., can be obtained in accordance with manufacturing process [II] for polycarbonate, described hereinabove.

Furthermore, it is preferable from an environmental standpoint to manufacture polycarbonate by the method of the present invention because toxic substances such as phosgene and methylene chloride are not used.

[III] Process for Recycling the Aromatic Hydroxy Compound

In process [II] for manufacturing polycarbonate hereinabove, aromatic hydroxy by-products that are produced together with polycarbonate, as shown by the reaction formulas hereinabove, are removed from the reaction system.

In the present invention, the nitrogen-containing basic compound is separated and removed from these aromatic hydroxy compounds before they are recycled to process [I] for reuse.

Conventional methods can be used to separate and remove nitrogen-containing basic compounds from aromatic dihydroxy compounds. Specifically, for example, aromatic hydroxy compounds and nitrogen-containing basic compounds can be separated by distilling by-product removed from the reactor in process [II] for manufacturing polycarbonate. Or the by-product may be distilled after adding acid to it. Another alternative is to remove the nitrogen-containing basic compound by adsorption, using a solid acid such as ion-exchange resin or activated clay. Still another alternative is to use a combination of distillation and adsorption. The preferred method is distillation with acid addition and adsorption.

It is preferred that the refined aromatic hydroxy compound contain no more than $10^{-4}$ mole per mole, preferably no more than $10^{-5}$ mole per mole, of nitrogen-containing basic compound.

In the present invention, after the nitrogen-containing basic compound is removed from the aromatic hydroxy by-product produced in the polycarbonate manufacturing process, the aromatic hydroxy compounds are recycled to the diaryl carbonate manufacturing process for reuse, as described hereinabove. When diaryl carbonate is manufactured using aromatic hydroxy compounds from which the nitrogen-containing basic compounds have been removed in this way, the production rate of (selectivity for) alkyl aromatic ethers such as anisole can be kept very low. Accordingly, aromatic hydroxy compounds produced as by-product in the polycarbonate manufacturing process can be used effectively to manufacture diaryl carbonate, thereby improving the productivity of the polycarbonate manufacturing operation.

The use of aromatic hydroxy compound containing in excess of $10^{-4}$ mole per mole of nitrogen-containing basic compound in the reaction with dialkyl carbonate increases the selectivity for alkyl aromatic ethers.

In the present invention, it is preferred to conduct the above-described processes [I] to [III] continuously as polycarbonate is manufactured.

When polycarbonate is manufactured in accordance with the present invention, as described hereinabove, diaryl carbonate manufactured from aromatic hydroxy compounds and dialkyl carbonate can be used as a raw material to manufacture polycarbonate, and aromatic hydroxy compounds produced as by-products of the polycarbonate manufacturing process can be refined and reused as raw materials in the diaryl carbonate manufacturing process without diminishing the selectivity for diaryl carbonate. The present invention therefore enables polycarbonate to be manufactured with good productivity.

EXAMPLES

Figure 1:
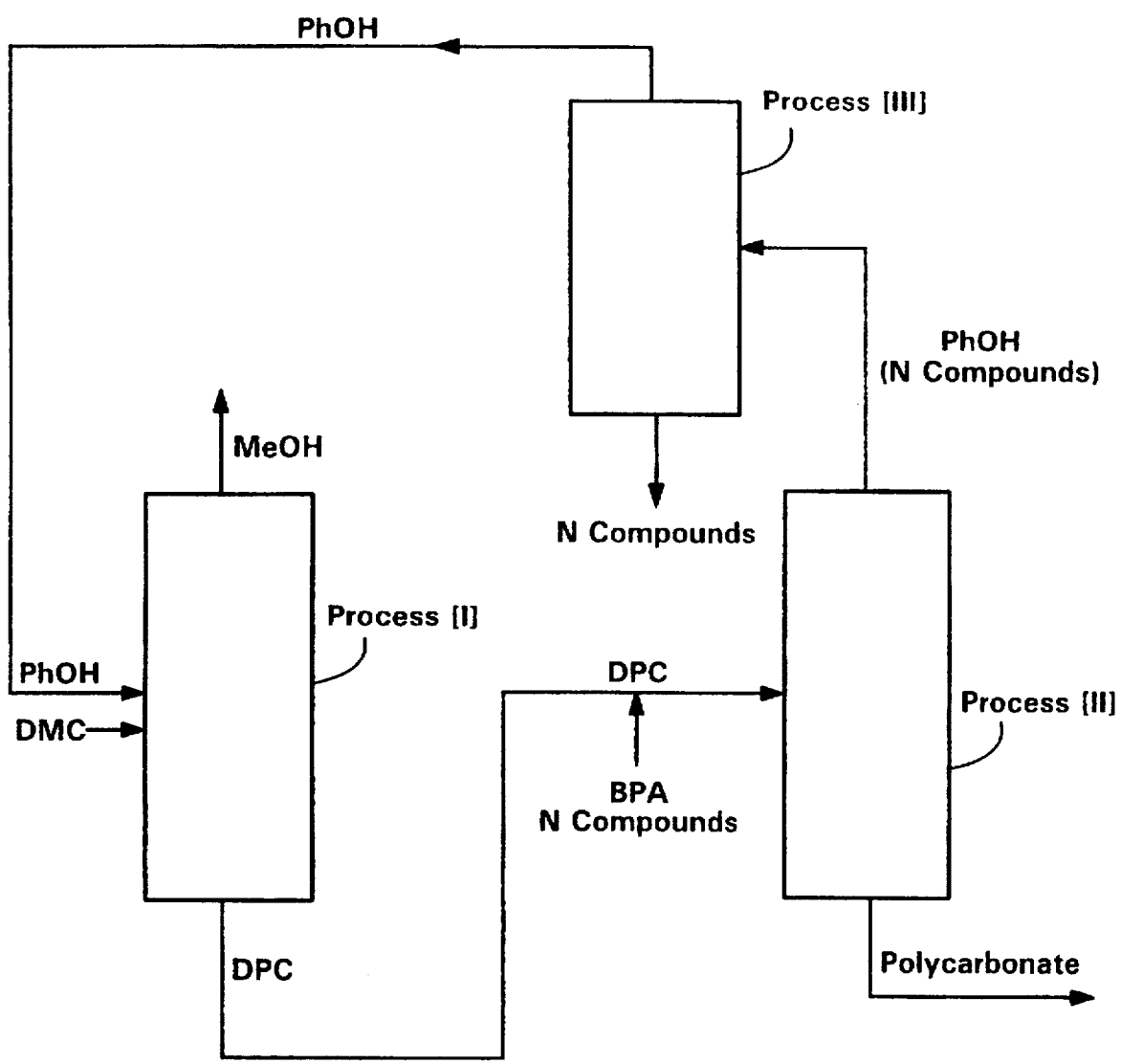
FIG. 1 is a process flow chart for the manufacturing method for polycarbonate of the invention.

The present invention is described concretely hereinbelow by means of examples, but the invention is not limited by these examples.

Example 1

220.8 grams of reagent-grade phenol and 257.7 g of dimethyl carbonate were charged to a 1 L autoclave, and the temperature was raised to 220° C. in a nitrogen atmosphere. At this point, 40.6 g of a phenolic solution containing a 31% concentration of titanium tetraphenoxide was heated to 160° C. and added.

The reaction was conducted for 4 h, while maintaining the temperature at 220° C.

The yields of phenyl methyl carbonate and anisole, based on phenol content, were 4.9% and 0.16%, respectively.

Example 2

Phenol containing 32 ppm ($5'10^{-5}$ mole per mole) of trimethylamine was used under conditions identical to those in Example 1; the yields of phenyl methyl carbonate and anisole were the same as in Example 1.

Example 3

Phenol containing 55 ppm ($5'10^{-5}$ mole per mole) of triethylamine was used under conditions identical to those in Example 1; the yields of phenyl methyl carbonate and anisole were the same as in Example 1.

Example 4

Phenol containing 320 ppm ($5'10^{-4}$ mole per mole) of trimethylamine was used as a raw material under conditions identical to those in Example 1. There was no change in the yield of phenyl methyl carbonate, but the amount of anisole produced increased to 0.8%.

Example 5 p-Toluenesulfonic acid was added to 1 L of phenol containing trimethylamine, identical to that used in Example 2, so that there were twice as many moles of the acid as trimethylamine, and distillation was conducted at ordinary pressure. The first 100 mL of distillate was discarded, and then 800 mL of distillate was collected. The trimethylamine concentration in this distilled phenol did not exceed 10 ppm.

A reaction was conducted under conditions identical to those in Example 1, using this phenol as a raw material. The results were identical to those in Example 1, with a phenyl methyl carbonate yield of 4.9% and anisole yield of 0.15%.

Example 6

One liter of phenol containing trimethylamine, identical to that used in Example 2, was distilled at ordinary pressure. The first 300 mL of distillate was discarded, and then 500 mL of distillate was collected (trimethylamine concentration: 15 ppm).

A reaction was conducted under conditions identical to those in Example 1, using this phenol as a raw material. The results were identical to those in Example 1, with a phenyl methyl carbonate yield of 4.9% and anisole yield of 0.16%.

Examples 7–10

Activated clay or ion-exchange resin was added to 1 L of the same type of phenol containing trimethylamine used in Example 2. The mixture was stirred in a nitrogen atmosphere at 60° C. for 4 hours and filtered hot to treat the phenol. Prior to the treatment, the activated clay was calcined at 50° C., and the ion-exchange resin was washed in reagent-grade phenol.

Table 1 shows the solid acid used in the treatment and the reaction results.

TABLE 1

| Example | Solid Acid | Amount Added (g) | Amine Content (ppm) | Results of Reaction (Yield: %) Phenyl methyl Carbonate | Anisole |
|---|---|---|---|---|---|
| 7 | Japanese activated clay SA-254 | 20 | ⟨10 | 4.9 | 0.16 |
| 8 | Organo Amberlyst 16 | 25 | ⟨10 | 4.9 | 0.16 |
| 9 | Amberlyst 31 | 25 | ⟨10 | 4.9 | 0.16 |
| 10 | Amberlyst 252H | 25 | ⟨10 | 4.9 | 0.15 |

Examples 11–13

Reactions were conducted under conditions identical to those in Example 1, using various catalysts and phenol containing 10 ppm ($1.5 \cdot 10^{-5}$ mole per mole) of trimethylamine.

TABLE 2

| Example | Catalyst | Results of Reaction (Yield: %) Phenyl methyl Carbonate | Anisole |
|---|---|---|---|
| 11 | $Sn_2O$ | 5.0 | 0.15 |
| 12 | PbO | 4.9 | 0.16 |
| 13 | $Bu_2Sn$ | 5.0 | 0.17 |

Example 14

[I] Diphenyl Carbonate Manufacturing Process 0.94 kilomole per hour of phenol that had been through process [II] for manufacturing polycarbonate and process [III] for recycling phenol and 0.01 kilomole per hour of titanium tetraphenoxide were fed to the twentieth stage of a first continuous reaction-type distillation apparatus equipped with a 40-stage distilling column consisting of a combination of a tray-type section with 20 theoretical plates and a packed section with 20 theoretical plates. Meanwhile, 3.3 kilomoles per hour of dimethyl carbonate was fed to the bottom of the column of the first continuous reaction-type distilling apparatus, as a continuous reaction was conducted at a temperature of 206° C. and residence time in the bottom of the column of 30 min.

While distilling off the low-boiling-point component containing methanol from the top of the column, the high-boiling-point component containing catalyst components and phenyl methyl carbonate were continuously removed from the bottom of the column, and fed to the midpoint of a second continuous reaction-type distillation apparatus equipped with a packed distilling column with 20 theoretical plates. The reaction was conducted continuously at a temperature of 200° C. at the base of the column for a residence time of 1.5 h. While distilling off the low-boiling-point component containing dimethyl carbonate from the top of the column, the high-boiling-point component containing catalyst components and diphenyl carbonate were continuously removed from the bottom of the column and fed to the twentieth stage of a third packed distilling column with 25 theoretical plates. Diphenyl carbonate and catalyst were continuously fractionated at a temperature of 179° C. and pressure of 15 torr at the column top and reflux ratio of 0.8.

The refined diphenyl carbonate was continuously fed to the subsequent polycarbonate manufacturing process at a rate of 0.16 kilomole per hour.

[II] Polycarbonate Manufacturing Process

Bisphenol A (made by GE Plastics Japan, Ltd.), shown to have no more than 1 ppb of alkali metals and alkaline-earth metals by elemental analysis, was used as received as a raw material.

Diphenyl carbonate manufactured in the diphenyl carbonate manufacturing process and confirmed to contain no more than 1 ppb of alkali metals and alkaline earth metals was used as a raw material.

A 20 percent tetramethylammonium hydroxide aqueous solution (made by Toyo Gosei Co.), verified to have no more than 1 ppb of alkali metals and alkaline-earth metals, was also used as a raw material.

0.44 kilomole of bisphenol A (made by G.E. Plastics Japan, Ltd.) and 0.449 kilomole of diphenyl carbonate manufactured in the diphenyl carbonate manufacturing process were charged to a first 250 L tank and melted at 140° C. Meanwhile, 0.16 kilomole per hour of bisphenol A and 0.163 kilomole per hour of diphenyl carbonate were fed to the tank to maintain the original levels, as the resultant solution was sent to a second 50 L stirred tank at a rate of 0.16 kilomole per hour, based on the bisphenol A content. The temperature of the stirred tank was maintained at 180° C.

As catalyst, 0.04 mole per hour of tetramethylammonium hydroxide ($2.5 \times 10^{-4}$ mole per mole of bisphenol A) and 0.00016 mole per hour of sodium hydroxide ($1 \times 10^{-6}$ mole per mole of bisphenol A) were added. As the mixture was stirred, the component levels were maintained in such a way that the residence time would be 30 min.

Next, 0.16 kilomole per hour of this reaction solution, based on the bisphenol A, was sent to a subsequent 50 L stirred tank with a temperature of 210° C. and pressure of 200 mm Hg. The component levels were adjusted so that the residence time was 30 min, and the reaction solution was stirred. Phenol, which was produced continuously, was distilled off from the distilling column, as bisphenol A, diphenyl carbonate, and polycarbonate oligomers were returned to the reaction system.

Next, this reaction solution was sent, at a rate of 0.16 kilomole of bisphenol A per hour, to a third 50 L stirred tank with a temperature of 240° C. and pressure of 15 mm Hg. The levels were adjusted to achieve a residence time of 30 min, and phenol was distilled off, as the solution was stirred in the manner described hereinabove. The intrinsic viscosity [h] of the reaction product obtained when the reaction achieved a steady state was 0.15 dL/g.

Next, the pressure of this reaction product was elevated with a gear pump, the product was sent to a centrifugal thin-film evaporator at a rate of 0.16 kilomole per hour of bisphenol A, and the reaction was continued. The thin-film evaporator was maintained at a temperature and pressure of 270° C. and 2 mm Hg, respectively. Using a gear pump, the reaction product was sent at a rate of 0.16 kilomole per hour of bisphenol A (approximately 40 kg/h) from the bottom of the evaporator to a twin-screw horizontal polymerization tank (L/D=3, stirring element rotational diameter=220 mm, internal capacity=80 L) maintained at 290° C. and 0.2 mm Hg, where it was polymerized for a residence time of 30 min. As polycarbonate was manufactured continuously, the phenol produced was distilled off in the above-described manner. At this point, the intrinsic viscosity [IV] of the polymer was 0.49 dL/g.

The total amount of phenol produced in this polycarbonate manufacturing process was approximately 0.32 kilomole per hour, and it was all sent to the subsequent recycling process.

This phenol contained 78 ppm of trimethylamine (1.25× $10^{-4}$ mole per mole of phenol), a decomposition product of tetramethylammonium hydroxide.

[III] Phenol Recycling Process p-Toluenesulfonic acid was added to the phenol that was continuously produced in the polycarbonate manufacturing process so that there were twice as many moles of the acid as trimethylamine in the phenol, and the phenol was continuously stirred in a static mixer and sent to a simple distillation column, where it was continuously distilled at ordinary pressure. There was no more than 5 ppm of trimethylamine in the distilled phenol (no more than $8·10^{-6}$ mole per mole of phenol).

All of this phenol was continuously sent to the diphenyl carbonate manufacturing process, hereinabove.

The selectivity for anisole in process [I] after 24 h of continuous operation was 0.5%, based on the phenol recovered.

Comparative Example 1

An operation identical to that in Example 14 was conducted, except that p-toluenesulfonic acid was not added in the phenol recycling process [III].

The selectivity for anisole in process [I] after 24 hours of continuous operation was 2.1%, based on the phenol recovered.

We claim:

1. A method for making polycarbonate comprising (a) reacting dialkyl carbonate and an aromatic hydroxy compound in the presence of a catalyst to make a diaryl carbonate and removing alcoholic by-product and dialkyl carbonate by-product from the reaction system, (b) reacting the diaryl carbonate and an aromatic dihydroxy compound in the presence of a catalyst containing at least one nitrogen-containing basic compound and removing aromatic hydroxy compound by-product from the reaction system, and (c) separating and removing the nitrogen-containing basic compound from the aromatic hydroxy compound by-product and recycling the resultant aromatic hydroxy compound to process step (a).

2. The method of claim 1 wherein the amount of nitrogen-containing basic compound in the aromatic hydroxy compound recycled to process step (a) does not exceed $10^{-4}$ mole per mole.

3. The method of claim 1, wherein the dialkyl carbonate is dimethyl carbonate or diethyl carbonate.

4. The method of claim 1, wherein the aromatic hydroxy compound is phenol, m-cresol, or p-cresol.

5. The method of claim 3 wherein the dialkyl carbonate is dimethyl carbonate.

6. The method of claim 4 wherein the aromatic hydroxy compound is phenol.

7. The method of claim 6 wherein the dialkyl carbonate is dimethyl carbonate.

8. The method of claim 1 wherein the dialkyl carbonate and the aromatic hydroxy compound are reacted in a reactive distillation column which separates low boiling products from high boiling products as soon as they are produced.

9. The method of claim 2 wherein the nitrogen-containing basic compound readily decomposes at high temperatures.

10. The method of claim 9 wherein the nitrogen-containing compound is a tertiary amine with 24 to 50 carbon atoms or a tetraalkylamonium hydroxide.

* * * * *